United States Patent
Ellis

(10) Patent No.: US 10,571,690 B2
(45) Date of Patent: Feb. 25, 2020

(54) AUTOMOTIVE WINDOW WITH TRANSPARENT LIGHT GUIDE DISPLAY

(71) Applicant: GM Global Technology Operations LLC, Detroit, MI (US)

(72) Inventor: Susan C. Ellis, Enniskillen (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/023,417

(22) Filed: Jun. 29, 2018

(65) Prior Publication Data

US 2020/0004014 A1    Jan. 2, 2020

(51) Int. Cl.
| | |
|---|---|
| *G02B 27/01* | (2006.01) |
| *B60K 35/00* | (2006.01) |
| *F21V 8/00* | (2006.01) |

(52) U.S. Cl.
CPC .......... *G02B 27/0101* (2013.01); *B60K 35/00* (2013.01); *G02B 6/0051* (2013.01); *G02B 6/0068* (2013.01); *G02B 6/0076* (2013.01); *G02B 6/0088* (2013.01); *G02B 6/0095* (2013.01); *B60K 2370/186* (2019.05); *B60K 2370/188* (2019.05); *B60K 2370/331* (2019.05); *B60K 2370/334* (2019.05); *B60K 2370/77* (2019.05); *G02B 2027/0141* (2013.01)

(58) Field of Classification Search
None
See application file for complete search history.

(56) References Cited

U.S. PATENT DOCUMENTS

| | | | |
|---|---|---|---|
| 2015/0160398 A1* | 6/2015 | Louh | G02B 6/0031 362/607 |
| 2018/0267344 A1* | 9/2018 | Wu | G02F 1/1323 |
| 2019/0025497 A1* | 1/2019 | Chen | G02F 1/133615 |
| 2019/0129091 A1* | 5/2019 | Yamamoto | G02B 6/0088 |

* cited by examiner

*Primary Examiner* — Ashok Patel

(57) ABSTRACT

A window for a motor vehicle includes an inner glass pane, an outer glass pane, and a first display module having a first light source, a first light guide disposed between the inner glass pane and the outer glass pane and configured to receive light from the first light source, a second light source, and a second light guide disposed between the inner glass pane and the outer glass pane and configured to receive light from the second light source. When the first light source is activated a first signal is displayed through the first light guide, when the second light source is activated a second signal is displayed through the second light guide, and when the first light source and the second light source are activated a third signal is displayed through the first light guide and the second light guide.

20 Claims, 3 Drawing Sheets

AUTOMOTIVE WINDOW WITH TRANSPARENT LIGHT GUIDE DISPLAY

INTRODUCTION

The present disclosure relates to an automotive window with a transparent light guide display for communicating with a user of a motor vehicle or a road user.

As autonomous vehicle systems and ride sharing services proliferate, new challenges have arisen related to these technologies and services, especially in communicating vehicle intent and identity. For example, in non-autonomous vehicles, a driver of a motor vehicle would communicate with other road users, such as pedestrians or cyclists, with hand gestures or words to indicate the intent of the driver. In autonomous and semi-autonomous motor vehicles, a human or human driver may or may not be present and paying attention to the surrounding environment and thus unable or unwilling to communicate the intent of the autonomous vehicle to other road users. In another example, in a ride share economy where one motor vehicle is shared among many users, there is a need to easily identify a reserved ride share vehicle for a user of the vehicle that does not require the aesthetics of the vehicle to be compromised with signs, permanent graphics, etc. In another example, the display faces inward to provide illumination of the vehicle interior.

Thus, there is a need for a display system that functions to communicate identity and intention of the motor vehicle that is robust and cost-effective without impacting the aesthetics of the motor vehicle.

SUMMARY

According to several aspects, a window for a motor vehicle is provided. The window includes an inner glass pane, an outer glass pane, and a first display module having a first light source, a first light guide disposed between the inner glass pane and the outer glass pane and configured to receive light from the first light source, a second light source, and a second light guide disposed between the inner glass pane and the outer glass pane and configured to receive light from the second light source. When the first light source is activated a first signal is displayed through the first light guide, when the second light source is activated a second signal is displayed through the second light guide, and when the first light source and the second light source are activated a third signal is displayed through the first light guide and the second light guide.

In one aspect, the third signal is a combination of the first signal and the second signal.

In another aspect, the first light guide is disposed on the inner glass pane, the second light guide is disposed on the first light guide, and the outer glass pane is disposed on the second light guide.

In another aspect, the first light guide includes a first film layer disposed in or on the first light guide and the second light guide includes a second film layer disposed in or on the second light guide.

In another aspect, the first light guide and the second light guide are transparent when the first light source and the second light source are not activated.

In another aspect, a frame is disposed at least partially around the inner glass pane and the outer glass pane.

In another aspect, the first light source and the second light source are disposed within the frame.

In another aspect, a second display module is disposed adjacent the first display module, the second display module having a third light source, a third light guide disposed between the inner glass pane and the outer glass pane and configured to receive light from the third light source, a fourth light source, and a fourth light guide disposed between the inner glass pane and the outer glass pane and configured to receive light from the fourth light source, and when the third light source is activated a fourth signal is displayed through the third light guide, when the fourth light source is activated a fifth signal is displayed through the fourth light guide, and when the third light source and the fourth light source are activated a sixth signal is displayed through the third light guide and the fourth light guide.

In another aspect, the first, second, and third signals are different from one another and the fourth, fifth, and sixth signals are different from one another.

In another aspect, one of the first signal, the second signal, and the third signal is displayed in combination with one of the fourth signal, the fifth signal, and the sixth signal to uniquely identify the motor vehicle to a user of the motor vehicle.

In another aspect, the first signal, the second signal, and the third signal are indicative of an intention of the motor vehicle.

In another aspect, the first light source and the second light source are RGB light emitting diodes.

According to several other aspects, a window for a motor vehicle is provided having an inner glass pane, an outer glass pane, and a first display module having a first light source, a first light guide disposed between the inner glass pane and the outer glass pane and configured to receive light from the first light source, a first film layer disposed in or on the first light guide, a second light source, a second light guide disposed between the inner glass pane and the outer glass pane and configured to receive light from the second light source, and a second film layer disposed in or on the second light guide. When the first light source is activated a first signal is displayed through the first light guide, when the second light source is activated a second signal is displayed through the second light guide, and when the first light source and the second light source are activated a third signal is displayed through the first light guide and the second light guide.

In one aspect, the first film layer includes a first shape and the second film layer includes a second shape, and wherein the first shape and the second shape are different.

In another aspect, the first shape is partially lit by the light emitted from the first light source and the second shape is partially lit by the light emitted from the second light source.

In another aspect, the third signal is a combination of the first signal and the second signal.

In another aspect, the first light guide is disposed on the inner glass pane, the second light guide is disposed on the first light guide, and the outer glass pane is disposed on the second light guide.

In another aspect, the first light guide and the second light guide are transparent when the first light source and the second light source are not activated.

In another aspect, a second display module is disposed adjacent the first display module, the second display module having a third light source, a third light guide disposed between the inner glass pane and the outer glass pane and configured to receive light from the third light source, a third film layer disposed on or in the third light guide, a fourth light source, a fourth light guide disposed between the inner glass pane and the outer glass pane and configured to receive light from the fourth light source, and a fourth film layer disposed on or in the fourth light guide, and when the third light source is activated a fourth signal is displayed through the third light guide, when the fourth light source is activated a fifth signal is displayed through the fourth light guide, and when the third light source and the fourth light source are activated a sixth signal is displayed through the third light guide and the fourth light guide, and wherein one of the first signal, the second signal, and the third signal is displayed in combination with one of the fourth signal, the fifth signal, and the sixth signal to uniquely identify the motor vehicle to a user of the motor vehicle or wherein one of the first signal, the second signal, the third signal, the fourth signal, the fifth signal, and the sixth signal is indicative of an intention of the motor vehicle.

In several other aspects, a front windshield for autonomous motor vehicle includes an inner glass pane, an outer glass pane, and a first display module having a first light source, a first light guide disposed between the inner glass pane and the outer glass pane and configured to receive light from the first light source, a first film layer disposed in or on the first light guide and having a first shape, a second light source, a second light guide disposed between the inner glass pane and the outer glass pane and configured to receive light from the second light source, the second light guide disposed directly over the first light guide, and a second film layer disposed in or on the second light guide having a second shape different from the first shape; and when the first light source is activated a first signal is displayed through the first light guide, when the second light source is activated a second signal is displayed through the second light guide, and when the first light source and the second light source are activated a third signal is displayed through the first light guide and the second light guide, and wherein the third signal is a combination of the first signal and the second signal that is different from the first signal and the second signal, and wherein the first light guide and the second light guide are transparent when the first light source and the second light source are not activated.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
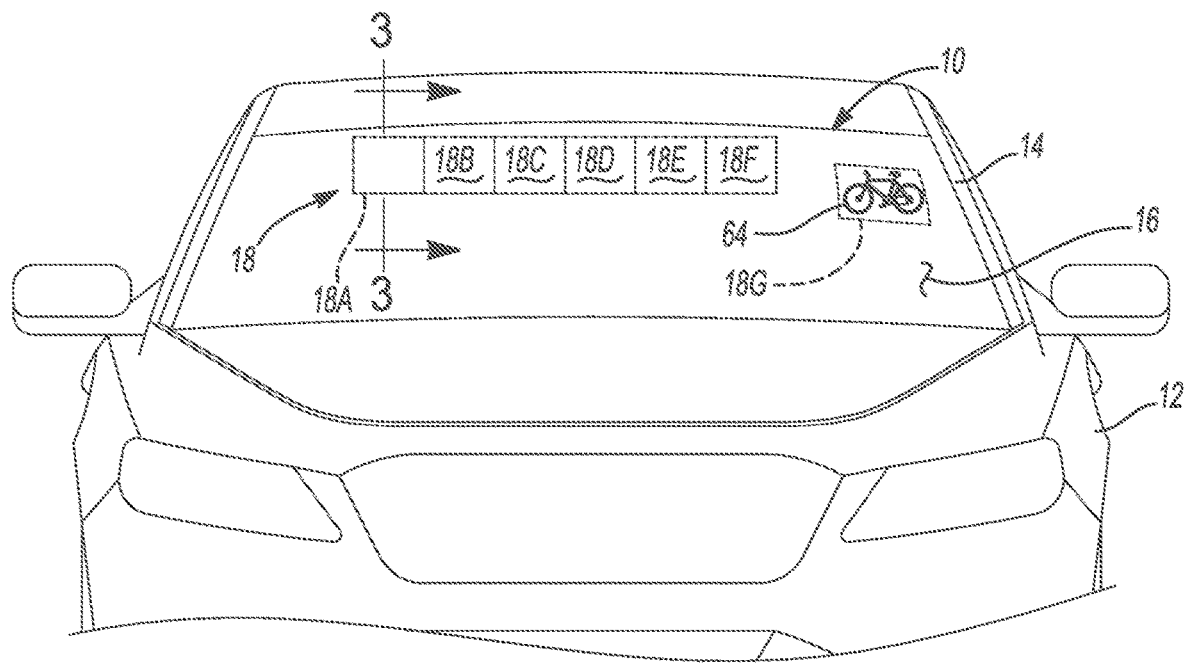
FIG. 1 is a front view of a window having a multi-layer display in a first operating condition illustrated in an exemplary motor vehicle.
Figure 2:
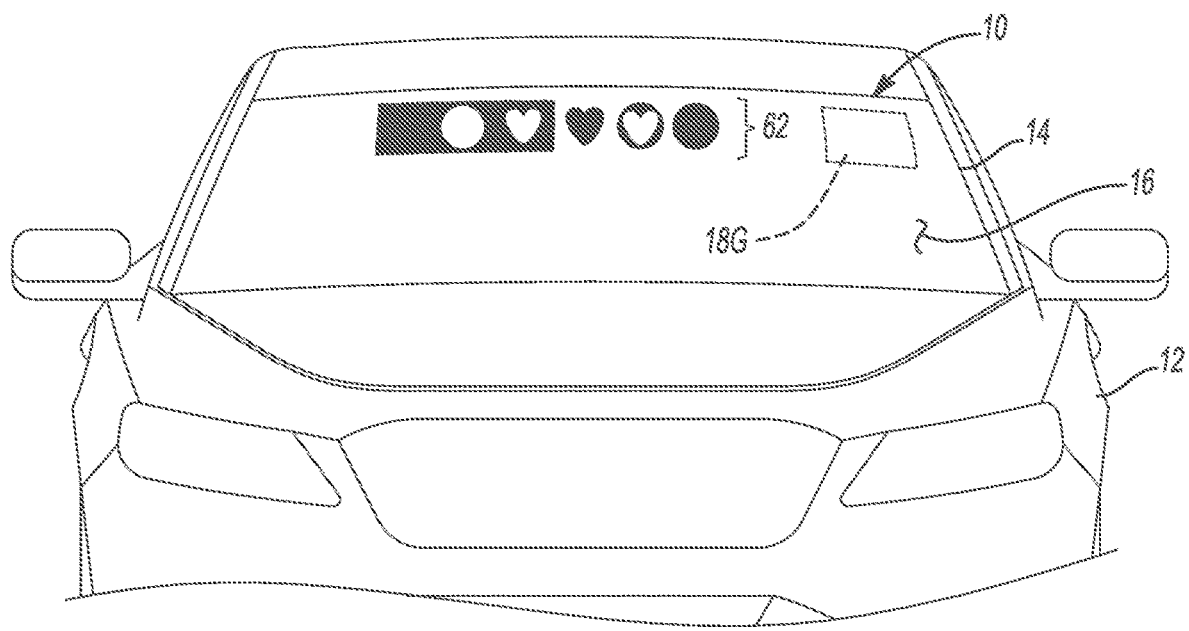
FIG. 2 is a front view of the window having a multi-layer display in a second operating condition illustrated in the exemplary motor vehicle.

Referring to FIGS. 1 and 2, a window having a multi-layer display according to the principles of the present disclosure is generally indicated by reference number 10. The window 10 is illustrated with an exemplary motor vehicle 12. In the example provided, the window 10 is a front windshield of the motor vehicle 12, though it should be appreciated that the window 10 may be a side window or a rear window without departing from the scope of the present disclosure. The motor vehicle 12 may be equipped with an autonomous driving system and may be a passenger car, bus, truck, sport utility vehicle, or any other vehicle.

The window 10 generally includes a frame or trim 14 that surrounds a transparent portion 16. The window 10 includes one or more multi-layer display modules 18 disposed within the transparent portion 16. In the example provided, the window 10 includes seven multi-layer display modules, labeled 18A-G in the drawings. However, it should be appreciated that the window 10 may have any number of multi-layer display modules 18 without departing from the scope of the present disclosure.

Figure 3:
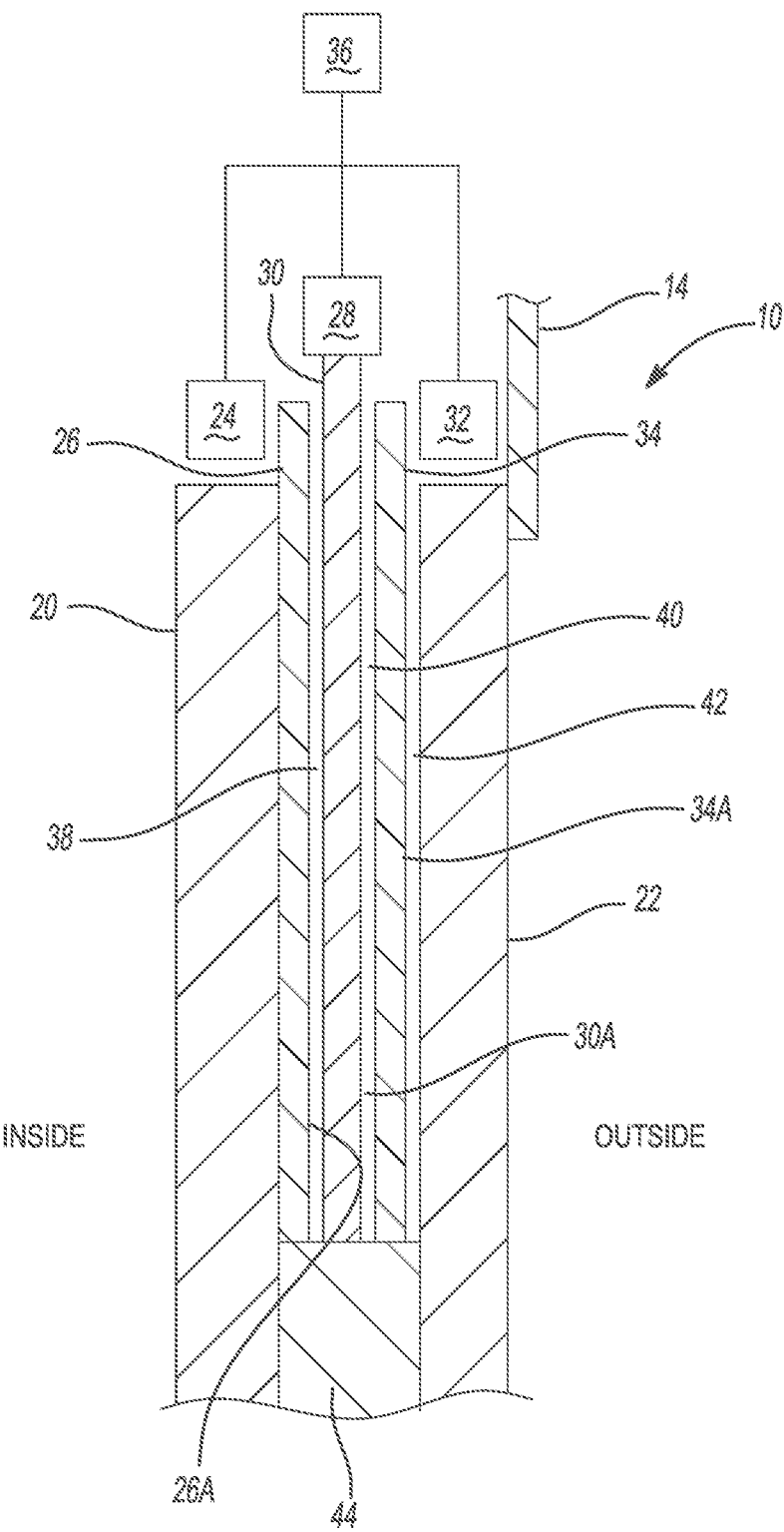
FIG. 3 is a cross-sectional view of the window viewed in the direction of arrows 3-3 in FIG. 1.

Turning to FIG. 3, the first multi-layer display module 18A will be described in detail, though it should be appreciated that each multi-layer display module 18A-G is substantially similar. The multi-layer display modules 18 are disposed partially within the trim 14 and between an inner glass pane 20 and an outer glass pane 22. The glass panes 20, 22 form the transparent portion 16 of the window 10. The first multi-layer display module 18A includes a first light source 24 associated with a first light guide 26, a second light source 28 associated with a second light guide 30, and a third light source 32 associated with a third light guide 34. While the present example shows three layers of light sources and light guides, it should be appreciated that as few as one layer and as many as five layers may be included without departing from the scope of the present disclosure. The multi-layer display modules 18 may be inward facing, outward facing, or both.

The light sources 24, 28, 32 are configured to selectively emit light into the light guides 26, 30, 34, respectively, upon command by a controller 36. The light sources 24, 28, 32 may take various forms, for example, the light sources 24, 28, 32 may be light emitting diodes (LED's). In a preferred example, the light sources 24, 28, 32 are RGB LED's capable of emitting various colors of light including white. It should be appreciated that the light sources 24, 28, 32 may include other types of light producing modules instead of LED's. In addition, the light sources 24, 28, 32 may include lamps, lenses, bezels, and other components without departing from the scope of the present disclosure. The light sources 24, 28, 32 are disposed within the trim 14 and are external to the inner glass pane 20 and the outer glass pane 22.

The light guides 26, 30, 34 are configured to diffuse the light emitted from the light sources 24, 28, 32, respectively. In one example, the light guides 26, 30, 34 are each comprised of a polymer embedded with a light diffuser pattern. The polymer is selected from the group consisting of polycarbonate, polymethyl methacrylate (PMMA), and silicone. However, it should be appreciated that other polymers may be used without departing from the scope of the present disclosure. The light diffuser pattern may be printed or an embossed/engraved graphic. The light guides 26, 30, 34 are stacked one upon the other between the inner glass pane 20 and the outer glass pane 22. Thus, the first light guide 26 is disposed on the inner glass pane 20, the second light guide 30 is disposed on the first light guide 26, the third light guide 34 is disposed on the second light guide 30, and the outer glass pane 22 is disposed on the third light guide 34. Where only two light guides are employed and the third light guide 34 is not present, the outer glass pane 22 is disposed on the second light guide 30.

Figure 4:
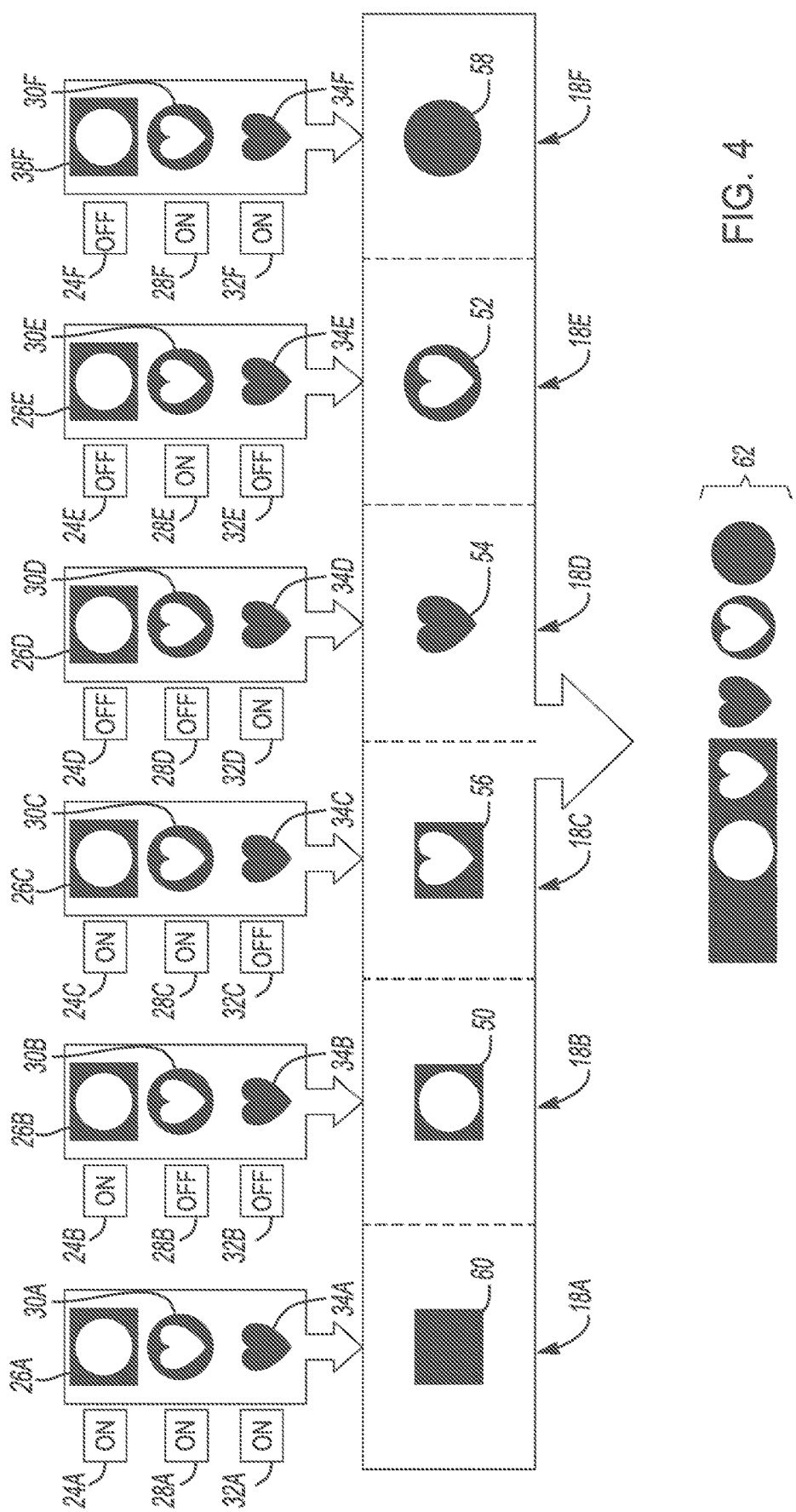
FIG. 4 is a diagram of an exemplary display pattern.

Each of the light diffuser patterns is deposited onto the outer surfaces 26A, 30A, 34A of the light guides 26, 30, 34, respectively. The light diffuser patterns provide an informational shape or signal to the light guides 26, 30, 34 when illuminated wherein each shape is different form the other. Examples of these shapes is shown in FIGS. 1, 2, and 4, as will be described below. In one example, the graphic layers 38, 40, and 42 are films having markings thereon. Finally, a clear filler 44 may be disposed between the inner glass pane 20 and the outer glass pane 22 below the light guides 26, 30, 34.

When a light source 24, 28, 32 is activated, light emitted from the light source 24, 28, 32 enters the associated light guide 26, 30, 34, respectively. The light is diffused therethrough and a signal is displayed through the outer glass pane 22 for whichever multi-layer display modules 18 are activated. The characteristics of the signal include the color of the light source 24, 28, 32 and optionally the shape or graphic provided by the associated light diffuser patterns at 26A, 30A, 34A. When more than one light source 24, 28, 32 is activated, the signals interact to create new, different signals. Thus, while only using three light sources and three light guides, as many as six different signals may be displayed per multi-layer display module 18. Where the light source 24, 28, 32 is capable of color, each of the six symbols may also be colored to provide more color options per multi-layer display module 18.

Turning to FIG. 4, an example of a display option for the window 10 is schematically shown for each of the multi-layer display modules 18A-F. Light sources 24A-F, 28A-F, and 32A-F are each shown schematically and labeled as either "on", i.e. activated and emitting light, or "off", i.e. not-activated and not emitting light. The shapes displayed via the light diffuser patterns at 26A-F, 30A-F, and 34A-F are also schematically shown next to their associated light source. In the example provided, the first light diffuser patterns at 26A-F have a first shape characterized as a box with a transparent circle center, the second light diffuser patterns at 30A-F have a second shape characterized as a circle with a transparent heart, and the third light diffuser patterns 34A-F have a third shape characterized as a solid heart. It should be appreciated that the first, second, and third shapes may take various forms so long as they are different from one another.

As noted above, activating only one of the light sources 24, 28, 32 displays one of the first, second, or third signal based on the associated light diffuser patterns at 26A-F, 30A-F, and 34A-F. For example, activating the first light source 24B of the second multi-layer display module 18B displays a first signal 50 in the second multi-layer display module 18B. Activating the second light source 28E of the fifth multi-layer display module 18E displays a second signal 52 in the fifth multi-layer display module 18E. Activating the third light source 32D of the fourth multi-layer display module 18D displays a third signal 54 in the fourth multi-layer display module 18D. Activating the first light source 24C and the second light source 28C of the third multi-layer display module 18C displays a fourth signal 56 in the third multi-layer display module 18C. Activating the second light source 28F and the third light source 32F of the sixth multi-layer display module 18F displays a fifth signal 58 in the sixth multi-layer display module 18F. Finally, activating the first light source 24A, the second light source 28A and the third light source 32A of the first multi-layer display module 18A displays a sixth signal 60 in the first multi-layer display module 18A. Thus, as described above, the fourth, fifth, and sixth signals are combinations of the first, second and third signals. When a given light source 24, 28, 32 is not activated, the associated light guide 26, 30, 34 is transparent. The signals 50, 52, 54, 56, 58, 60 when displayed form a pattern 62.

Returning now to FIG. 2, the pattern 62 is illustrated in the window 10. The pattern 62 may be used to uniquely identify the motor vehicle 12. In the example provided, 18,564 unique patterns 62 may be generated by the multi-layer display modules 18A-F. These unique patterns 62 may be used with a handheld mobile device, such as a smart phone, to quickly and easily identify a particular ride share vehicle or taxi by matching the pattern 62 on the handheld mobile device with the pattern 62 displayed on the window 10.

Returning to FIG. 1, the multi-layer display module 18G is shown activated to display a seventh signal 64 on the window 10. The seventh signal 64 is indicative of an intention of the motor vehicle 12. For example, the seventh signal 64 may include the image of a bicycle to indicate that the motor vehicle 12 detects a cyclist. The seventh signal 64 may flash to improve visibility and notice and may include additional layered images, as described above for the signals 56, 58, and 60. It should be appreciated that other images may be used in this context so long as the image is indicative of an intention of the motor vehicle 12 and is not an arbitrary shape.

In yet another use case, the light source 24 may be selectively activated to provide illumination to an interior cabin of the motor vehicle 12. In this embodiment, the first light guide 26 would direct the light from the light source 24 inwardly through the inner glass pane 20.

The window 10 having the multi-layer display modules 18 of the present disclosure offers several advantages. These include increased speed, decreased cost, adaptability of the equipment for next generation vehicles and windows, the ability to display signals on complex curved surfaces with non-rectangular trim edges, suitability for lamination, and suitability for multiple fixed image displays to show vehicle status and/or intention and/or illumination.

The terms "forward", "rear", "inner", "inwardly", "outer", "outwardly", "above", and "below" are terms used relative to the orientation of the motor vehicle 12 as shown in the drawings of the present application. Thus, "forward" refers to a direction toward a front of a motor vehicle, "rearward" refers to a direction toward a rear of a motor vehicle, "inner" and "inwardly" refers to a direction towards the interior of a motor vehicle, and "outer" and "outwardly" refers to a direction towards the exterior of a motor vehicle, "below" refers to a direction towards the bottom of the motor vehicle, and "above" refers to a direction towards a top of the motor vehicle.

Additionally, in the claims and specification, certain elements are designated as "first", "second", "third", "fourth", "fifth", "sixth", and "seventh". These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A window comprising:
   an inner glass pane;
   an outer glass pane; and
   a first display module having a first light source, a first light guide disposed between the inner glass pane and the outer glass pane and configured to receive light from the first light source, a second light source, and a second light guide disposed between the inner glass pane and the outer glass pane and configured to receive light from the second light source, and when the first light source is activated a first signal from the first light source is displayed through the first light guide, when the second light source is activated a second signal from the second light source is displayed through the second light guide, and when the first light source and the second light source are activated, the first and second signals interact to provide a third signal displayed through the first light guide and the second light guide,
   wherein the first signal includes a first color and the second signal includes a second color different than the first color.

2. The window of claim 1 wherein the third signal is a combination of the first signal and the second signal.

3. The window of claim 1 wherein the first light guide is disposed on the inner glass pane, the second light guide is disposed on the first light guide, and the outer glass pane is disposed on the second light guide.

4. The window of claim 1 wherein the first light guide includes a first light diffuser disposed in or on the first light guide and the second light guide includes a second light diffuser disposed in or on the second light guide.

5. The window of claim 1 wherein the first light guide and the second light guide are transparent when the first light source and the second light source are not activated.

6. The window of claim 1 further comprising a frame disposed at least partially around the inner glass pane and the outer glass pane.

7. The window of claim 6 wherein the first light source and the second light source are disposed within the frame.

8. The window of claim 1 further comprising a second display module disposed adjacent the first display module, the second display module having a third light source, a third light guide disposed between the inner glass pane and the outer glass pane and configured to receive light from the third light source, a fourth light source, and a fourth light guide disposed between the inner glass pane and the outer glass pane and configured to receive light from the fourth light source, and when the third light source is activated a fourth signal is displayed through the third light guide, when the fourth light source is activated a fifth signal is displayed through the fourth light guide, and when the third light source and the fourth light source are activated a sixth signal is displayed through the third light guide and the fourth light guide.

9. The window of claim 8 wherein the first, second, and third signals are different from one another and the fourth, fifth, and sixth signals are different from one another.

10. The window of claim 9 wherein one of the first signal, the second signal, and the third signal is displayed in combination with one of the fourth signal, the fifth signal, and the sixth signal to uniquely identify the motor vehicle to a user of the motor vehicle.

11. The window of claim 1 wherein the first signal, the second signal, and the third signal are indicative of an intention of the motor vehicle.

12. The window of claim 1 wherein the first light source and the second light source are RGB light emitting diodes.

13. A window comprising:
    an inner glass pane;
    an outer glass pane; and
    a first display module having a first light source disposed external to the inner and outer glass panes, a first light guide disposed between the inner glass pane and the outer glass pane and configured to receive light from the first light source, a first light diffuser disposed in or on the first light guide, a second light source disposed external to the inner and outer glass panes, a second light guide disposed between the inner glass pane and the outer glass pane and configured to receive light from the second light source, and a second light diffuser disposed in or on the second light guide; and
    when the first light source is activated a first signal from the first light source is displayed through the first light guide, when the second light source is activated a second signal from the second light source is displayed through the second light guide, and when the first light source and the second light source are activated, the first and second signals interact to provide a third signal displayed through the first light guide and the second light guide.

14. The window of claim 13 wherein the first light diffuser includes a first shape and the second light diffuser includes a second shape, and wherein the first shape and the second shape are different.

15. The window of claim 14 wherein the first shape is partially lit by the light emitted from the first light source and the second shape is partially lit by the light emitted from the second light source.

16. The window of claim 15 wherein the third signal is a combination of the first signal and the second signal.

17. The window of claim 13 wherein the first light guide is disposed on the inner glass pane, the second light guide is disposed on the first light guide, and the outer glass pane is disposed on the second light guide.

18. The window of claim 13 wherein the first light guide and the second light guide are transparent when the first light source and the second light source are not activated.

19. The window of claim 13 further comprising a second display module disposed adjacent the first display module, the second display module having a third light source, a third light guide disposed between the inner glass pane and the outer glass pane and configured to receive light from the third light source, a third light diffuser disposed on or in the third light guide, a fourth light source, a fourth light guide disposed between the inner glass pane and the outer glass pane and configured to receive light from the fourth light source, and a fourth light diffuser disposed on or in the fourth light guide, and
    when the third light source is activated a fourth signal is displayed through the third light guide, when the fourth light source is activated a fifth signal is displayed through the fourth light guide, and when the third light source and the fourth light source are activated a sixth signal is displayed through the third light guide and the fourth light guide,
    wherein one of the first signal, the second signal, and the third signal is displayed in combination with one of the fourth signal, the fifth signal, and the sixth signal to uniquely identify the motor vehicle to a user of the motor vehicle or wherein one of the first signal, the second signal, the third signal, the fourth signal, the fifth signal, and the sixth signal is indicative of an intention of the motor vehicle.

20. A window comprising:
an inner glass pane;
an outer glass pane; and
a first display module having a first light source disposed external to the inner and outer glass panes, a first light guide disposed between the inner glass pane and the outer glass pane and configured to receive light from the first light source, a first light diffuser disposed in or on the first light guide and having a first shape, a second light source disposed external to the inner and outer glass panes, a second light guide disposed between the inner glass pane and the outer glass pane and configured to receive light from the second light source, the second light guide disposed directly over the first light guide, and a second light diffuser disposed in or on the second light guide having a second shape different from the first shape; and when the first light source is activated a first signal from the first light source is displayed through the first light guide, when the second light source is activated a second signal from the second light source is displayed through the second light guide, and when the first light source and the second light source are activated, the first and second signals interact to provide a third signal displayed through the first light guide and the second light guide,
wherein the third signal is a combination of the first signal and the second signal that is different from the first signal and the second signal, and wherein the first light guide and the second light guide are transparent when the first light source and the second light source are not activated,
wherein the first signal includes a first color and the second signal includes a second color different than the first color.

* * * * *